United States Patent
Han

(10) Patent No.: US 7,262,731 B2
(45) Date of Patent: Aug. 28, 2007

(54) METHOD AND SYSTEM FOR OPTIMIZING LOCATION-BASED SERVICE BY ADJUSTING MAXIMUM ANTENNA RANGE

(75) Inventor: Gyuyoung Han, AhnYang (KR)

(73) Assignee: SK Telecom Co., Ltd., Seoul (KR)

( * ) Notice: Subject to any disclaimer, the term of this patent is extended or adjusted under 35 U.S.C. 154(b) by 688 days.

(21) Appl. No.: 10/725,630

(22) Filed: Dec. 1, 2003

(65) Prior Publication Data

US 2004/0162085 A1    Aug. 19, 2004

(30) Foreign Application Priority Data

Feb. 19, 2003  (KR)  .................. 10-2003-0010500
Jul. 31, 2003   (KR)  .................. 10-2003-0053225

(51) Int. Cl.
*G01S 5/14* (2006.01)
*H04B 17/02* (2006.01)

(52) U.S. Cl. ................ 342/357.02; 342/357.1; 455/9

(58) Field of Classification Search ............... None
See application file for complete search history.

(56) References Cited

U.S. PATENT DOCUMENTS

| 5,564,079 | A  | * | 10/1996 | Olsson | .............. | 455/456.3 |
| 6,522,888 | B1 | * | 2/2003  | Garceran et al. | ....... | 455/456.3 |
| 6,865,395 | B2 | * | 3/2005  | Riley | ................ | 455/456.1 |
| 6,919,841 | B2 | * | 7/2005  | Yamazaki | ............ | 342/357.06 |
| 7,123,928 | B2 | * | 10/2006 | Moeglein et al. | ....... | 455/456.3 |
| 7,130,642 | B2 | * | 10/2006 | Lin | ................. | 455/456.1 |
| 2001/0014604 | A1 | * | 8/2001 | Kingdon et al. | .......... | 455/427 |
| 2003/0008669 | A1 | * | 1/2003 | Stein et al. | ................ | 455/456 |
| 2003/0125044 | A1 | * | 7/2003 | Deloach et al. | ............ | 455/456 |
| 2006/0103575 | A1 | * | 5/2006 | Moeglein et al. | ....... | 342/357.15 |

* cited by examiner

*Primary Examiner*—Gregory C. Issing
(74) *Attorney, Agent, or Firm*—Jones Day

(57) ABSTRACT

Disclosed are a method and a system for optimizing location-based services by adjusting the maximum antenna range of a wireless base station. The system for optimizing location-based services by adjusting a maximum antenna range (MAR) of a base station, the system comprising: a test terminal for sending MAR optimizing data, including C-GPS geolocation information and A-GPS data which are received from at least one GPS satellite using conventional-GPS (C-GPS) and assisted-GPS (A-GPS) schemes, to at least one measurement point; a base transceiver station for transmitting and receiving signals and data to and from the test terminal and having a preset MAR; a base station controller for receiving and processing signals emitted from the base transceiver station and a mobile switching center connected to the base station controller; and a position determination entity for receiving the MAR optimizing data through a mobile communication network, analyzing the MAR optimizing data to update the MAR of a wireless base station that meets MAR optimizing requirements, and optimizing the location-based services.

21 Claims, 3 Drawing Sheets

METHOD AND SYSTEM FOR OPTIMIZING LOCATION-BASED SERVICE BY ADJUSTING MAXIMUM ANTENNA RANGE

FIELD OF THE INVENTION

The present invention relates to a method and a system for optimizing a location-based service ("LBS") by adjusting a maximum radius, i.e., maximum antenna range ("MAR"), of radio wave emissions from a base station; and more particularly to a method and a system for optimizing the LBS by adjusting the MAR of a wireless base station to a predetermined value to enable an A-GPS (Assisted Global Positioning System) mobile communication terminal located in an area covered by an optical repeater connected to the wireless base station by using an optical cable to receive a greater number of satellite signals and precisely determine its location.

BACKGROUND OF THE INVENTION

Many companies are struggling to develop new wireless Internet technologies which can be used to provide various communication services, such as wireless Internet services, regardless of places. Wireless Internet refers to an environment or technology which allows a moving user to access the Internet through a wireless network. With the development of mobile communication technologies and the explosive increase in the use of mobile phones, the wireless Internet services have also been greatly developed.

Among a variety of wireless Internet services provided to mobile terminals, such as cellular phones, PDAs or notebook computers, LBS is being popularized more and more due to its wide applications and availability. The LBS can be used in various applications and conditions, such as emergency assistance, criminal tracking, GIS (Geographic Information System), difference of mobile communication fees according to locations, traffic information, vehicle navigation, logistics control and location-based CRM (Customer Relationship Management).

In order to exploit the LBS, it is required to identify the location of a mobile communication terminal. A GPS is generally used to track the location of a mobile communication terminal.

The GPS is a worldwide navigation and positioning system which determines the location of an object on earth by using 24 GPS satellites orbiting the earth at an altitude of approximately 20,000 km. The GPS uses radio waves in a bandwidth of 1.5 GHz. Ground control stations which monitor the GPS satellites receive information transmitted from the satellites and synchronize transmission time. Users can monitor their locations by using GPS receivers. Generally, the GPS determines the location of an object by triangulation using four satellites. Three satellites are used for accurate triangulation, and a fourth satellite is in orbit to correct a timing error.

However, it is difficult to determine the location of an object in downtown areas surrounded by high-rise buildings due to so-called multi-path effects and the lack of visible satellites. Also, an accurate location determination can hardly be made in a tunnel or in a basement of a building where satellites are not visible (where radio waves cannot reach). In addition, GPS receivers may require a TTFF (Time To First Fix) of several minutes to over ten minutes to initially determine their location, thereby causing inconvenience to the users of location-based wireless Internet services.

A-GPS answers some of the inherent problems with GPS. The A-GPS determines the location of a mobile communication terminal by combining GPS with wireless communication network resources. A mobile communication terminal collects geolocation information from both the GPS satellites and a wireless communication network to determine its location in 3-D in geodetic coordinates (latitude, longitude and altitude) with high accuracy. The wireless network and the mobile communication terminal transmit and receive data or messages using parameters defined in IS (Interim Standard)-801-1.

In a CDMA (Code Division Multiple Access) communication network, one wireless base station (BS) covers an area corresponding to its maximum antenna range (MAR). The MAR is an area having a radius equal to the maximum distance that radio waves emitted from a base station antenna reach.

However, it is costly to install base stations based on MAR to cover every area in a country. Base stations installed in current mobile communication networks are set to have a uniform MAR of 3 Km to 5 Km. To provide high quality location-based services in the current mobile communication networks, base stations should be installed at every MAR coverage area.

To reduce the cost of installing base stations, the current mobile communication networks broaden the coverage of a voice or data call of a wireless base station by installing at least one optical repeater connected to the wireless base station by an optical cable. The optical repeater uses the same identification code as the wireless base station to which it is connected. Accordingly, the optical repeater can transfer the identification code of the connected base station to a position determination entity when a mobile communication terminal is located within an area covered by the optical repeater.

Therefore, if the terminal is in an area covered by the optical repeater, it is difficult to determine the location of a mobile communication terminal using an A-GPS scheme. In the A-GPS scheme, a mobile communication terminal is not equipped with a GPS receiver. The mobile communication terminal obtains an identification code (address) of the wireless base station covering the area in which it is located, and transfers the identification code to the position determination entity through a mobile communication network. The position determination entity confirms the identification code received through the mobile communication network and detects an MAR set for the pertinent wireless base station.

Based on the detected MAR, the position determination entity extracts coordinate information of GPS satellites from which GPS signals can be received in the coverage area of the wireless base station. Subsequently, the position determination entity transfers the coordinate information as assistance data to the mobile communication terminal through the mobile communication network. Upon receiving the assistance data, the mobile communication terminal detects the GPS signals based on the coordinate information of the GPS satellites which is included in the assistance data.

The coordinate information of the GPS satellites, which is received by the mobile communication terminal under the A-GPS scheme, can effectively be used only when the mobile communication terminal is located within the area corresponding to the MAR set for the wireless base station. If the mobile communication terminal is located at the boundary of the base station or in an area covered by an optical repeater that uses the same identification code as the base station, the assistance data will be improper and useless. If the mobile communication terminal detects GPS signals using improper GPS coordinate information, it will fail to accurately determine its location.

SUMMARY OF THE INVENTION

Accordingly, the present invention has been made to solve the above-mentioned problems occurring in the prior art, and an object of the present invention is to provide a method and a system for optimizing the LBS by adjusting the MAR of a wireless base station to a predetermined value to enable an A-GPS (Assisted Global Positioning System) mobile communication terminal located in an area covered by an optical repeater connected to the wireless base station by using an optical cable to receive a greater number of satellite signals and precisely determine its location.

In order to accomplish this object, there is provided a system for optimizing location-based services by adjusting a maximum antenna range (MAR) of a base station, the system comprising: a test terminal for sending MAR optimizing data, including C-GPS geolocation information and A-GPS data which are received from at least one GPS satellite using conventional-GPS (C-GPS) and assisted-GPS (A-GPS) schemes, to at least one measurement point; a base transceiver station for transmitting and receiving signals and data to and from the test terminal and having a preset MAR; a base station controller for receiving and processing signals emitted from the base transceiver station and a mobile switching center connected to the base station controller; and a position determination entity for receiving the MAR optimizing data through a mobile communication network, analyzing the MAR optimizing data to update the MAR of a wireless base station that meets MAR optimizing requirements, and optimizing the location-based services.

In accordance with another aspect of the present invention, there is provided a method for optimizing location-based services in a system comprising a test terminal for receiving GPS signals using C-GPS and A-GPS schemes, a mobile communication network which includes wireless base stations having preset MARs and a mobile switching center, and a position determination entity for resetting the MARs by communicating with an MAR database storing geolocation information and MARs of the wireless base stations, the method comprising the steps of: (a) receiving and storing C-GPS geolocation information and A-GPS data transferred from the test terminal; (b) analyzing the C-GPS geolocation information and A-GPS data of each wireless base station to determine an object wireless base station for which MAR optimization is needed; (c) calculating a new MAR using a MAR optimizing algorithm; and (d) setting the new MAR as the optimized MAR of the object wireless base station and storing it in the MAR database.

In accordance with another aspect of the present invention, there is provided a method for optimizing location-based services for use with a system including a test terminal for receiving GPS signals under C-GPS and A-GPS schemes and a position determination entity for resetting MARs of a wireless base stations of a mobile communication network by receiving C-GPS geolocation information and A-GPS data transferred from the test terminal, the method comprising the steps of: (a) obtaining and storing the C-GPS geolocation information of each measurement point while moving by using the test terminal set to a C-GPS operation mode; (b) measuring the GPS signals of said each measurement point under a A-GPS operation mode; (c) obtaining and storing A-GPS data under the A-GPS scheme; and (d) gathering and transferring the C-GPS geolocation information and the A-GPS data to the position determination entity.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
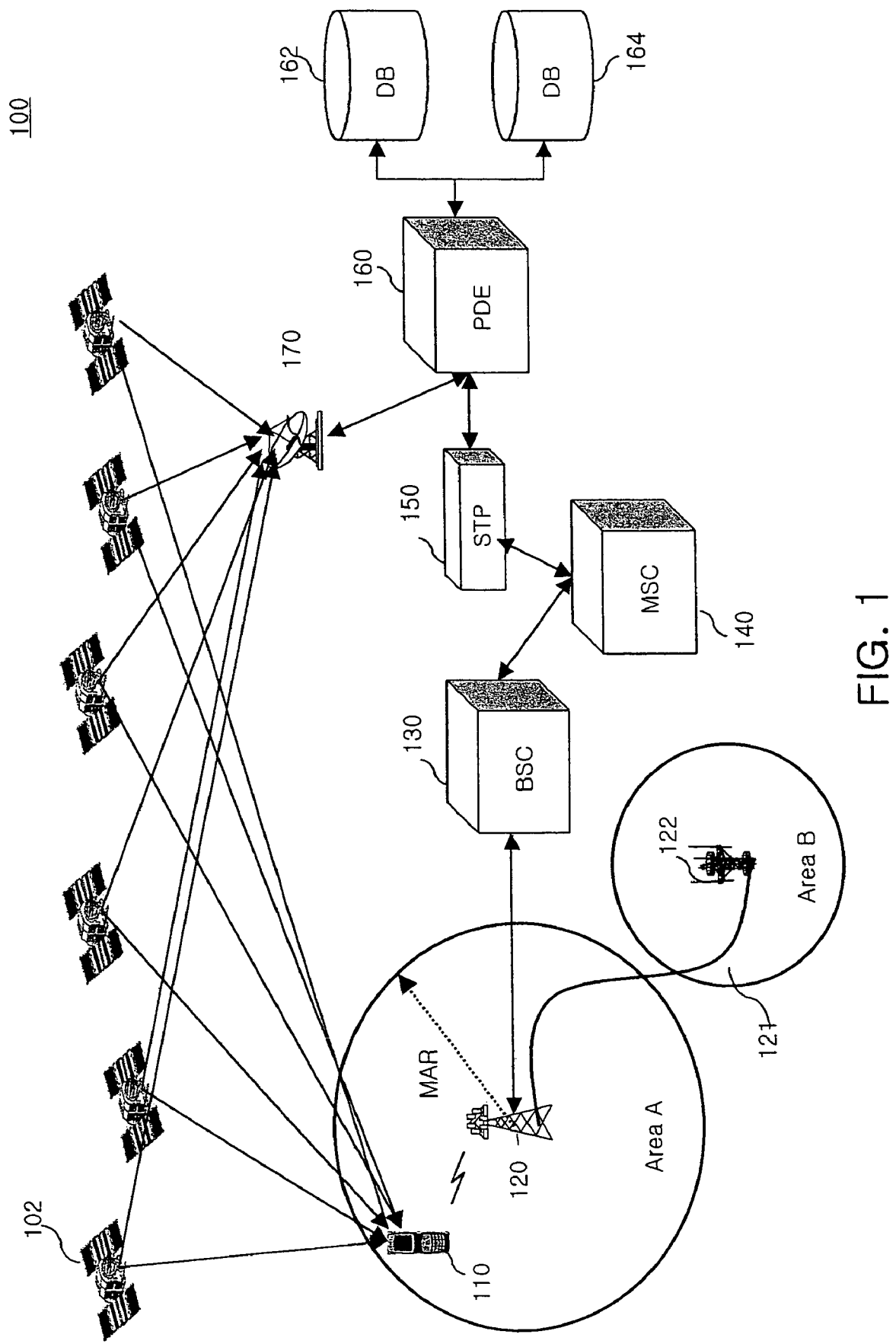
FIG. 1 is a block diagram of a system for optimizing LBS by adjusting the MAR of a wireless base station in accordance with a preferred embodiment of the present invention.

Hereinafter, a preferred embodiment of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention rather unclear.

FIG. 1 is a block diagram of a system for optimizing LBS by adjusting the MAR of a wireless base station in accordance with the present invention.

The LBS optimizing system 100 comprises a plurality of GPS satellites 102, a test terminal 110, a base transceiver station (BTS) 120, an optical repeater 122, a base station controller (BSC) 130, a mobile switching center (MSC) 140, a signal transfer point (STP) 150, a position determination entity (PDE) 160, an MAR database 162, an MAR optimizing database 164 and a reference GPS antenna 170.

The test terminal 110 is provided with a GPS antenna or a GPS receiver for receiving GPS signals from the plurality of GPS satellites 102, extracting navigation data included in the GPS signals and transferring the extracted navigation data to the position determination entity 160 through the mobile communication network. As a terminal for optimizing the MAR in a mobile communication system, the test terminal 110 collects data required for the MAR optimization while moving using a moving means such as a vehicle, and transfers the collected data to the position determination entity 160.

The test terminal 110 is a mobile communication terminal which can determine its location by using A-GPS or C-GPS (Conventional GPS) schemes. In other words, the test terminal 110 includes both an A-GPS receiver module and a C-GPS receiver to exploit the two GPS schemes.

C-GPS is capable of providing relatively accurate position determination, without being assisted by a communication network. C-GPS can normally determine the position of an object in an open-sky environment. In the C-GPS system, however, a terminal consumes lots of power and requires a TTFF of up to ten minutes. Also, a separate C-GPS receiver is required.

Compared to C-GPS, A-GPS assisted by a communication network can pinpoint a person's or object's position even indoors or in a place where GPS signals can hardly be received. A-GPS technology offers superior positioning accuracy and shortens the TTFF to several seconds or less. Moreover, it is energy-efficient because a terminal consumes less power. Also, it reduces manufacture cost of the terminal because an A-GPS receiver chip is combined with a modem chip to form an integral structure. A-GPS is a location tracking technology which combines C-GPS using GPS satellites with a network-assisted technology using a CDMA communication network.

The test terminal 110 periodically obtains A-GPS data (such as satellite identification codes, number of satellites, measurement time, strength of satellite signals, pseudorange, network ID and base station ID) using A-GPS scheme and C-GPS geolocation information (such as latitudes, longitudes and number of satellites) using C-GPS scheme. The test terminal 110 transfers the obtained A-GPS data and C-GPS geolocation information to the position determination entity 160 through the mobile communication network.

It will be explained in more detail how the test terminal 110 obtains the A-GPS data and the C-GPS geolocation information in accordance with the present invention. The test terminal 110 detects GPS signals at every predetermined position using a C-GPS receiver, and temporarily stores the detection results, i.e., C-GPS geolocation information, in its internal memory.

Also, in order to obtain positional data using A-GPS scheme, the test terminal 110 transfers rough position information (identification code of a wireless base station) to the position determination entity 160 through the mobile communication network. The position determination entity 160 searches for suitable assistance data using the rough position information received from the test terminal 110, and transfers the detected assistance data to the test terminal 110 through the mobile communication network. The assistance data refers to coordinate information of at least one GPS satellite, which has been extracted by using the identification code of the wireless base station transferred from the test terminal 110. Further, the coordinate information of at least one GPS satellite refers to information about coordinates of one or more GPS satellites which are determined to be visible at a position where the test terminal 110 is located.

Based on the assistance data received from the position determination entity 160, the test terminal 110 detects and receives GPS radio signals emitted from the visible GPS satellites 102. The test terminal 110 detects the GPS signals using an A-GPS receiver chip at every position where the C-GPS geolocation information has been obtained using C-GPS scheme, and temporarily stores the detection results, i.e., A-GPS data, in its internal memory. The test terminal 110 periodically transfers the C-GPS geolocation information obtained using C-GPS scheme and the A-GPS data obtained using A-GPS scheme (hereinafter referred to as "MAR optimizing data") to the position determination entity 160 using a built-in wireless modem.

The test terminal 110 can be a PDA (Personal Digital Assistant), a cell phone, a PCS (Personal Communication Service) phone, a handheld PC, a GSM (Global System for Mobile) phone, a W-CDMA (Wideband CDMA) phone, a CDMA-2000 phone, a MBS (Mobile Broadband System) phone, a notebook computer or a laptop computer. MBS phones refer to mobile phones which will be used in fourth-generation communication systems. The MAR optimizing method in accordance with the present invention can be used for both synchronous or asynchronous mobile communication systems and 4G ALL-IP systems.

The base transceiver station 120 receives a call access request signal from the test terminal 110 through a traffic channel among signal channels, and transfers the signal to the base station controller 130. The base station controller 130 controls the base transceiver station 120, and performs assignment of a wireless channel to the test terminal 110 and cancellation thereof, control of transmission outputs of the test terminal 110 and the base transceiver station 120, determination of soft handoff or hard handoff between cells, transcoding, vocoding, and operation and maintenance of the wireless base stations.

The base transceiver station 120 and the base station controller 130 have structures supporting both synchronous mobile communication systems and asynchronous mobile communication systems. The base transceiver station (BTS) 120 and the base station controller (BSC) 130 in a synchronous mobile communication system can be a radio transceiver subsystem (RTS) and a radio network controller (RNC) in an asynchronous mobile communication system. The base transceiver station 120 and the base station controller 130 in accordance with the present invention are not limited to those mentioned above, but may include a GSM network and a future 4G access network.

Radio waves emitted from the antenna of the base transceiver station 120 can be received by the test terminal 110 located within area A having a radius equal to the MAR. The signals are used to process calls of the test terminal 110 in area A. The MAR set for each base transceiver station 120 is stored in the position determination entity 160. Generally, the MAR is set uniformly to a range from 3 Km to 5 Km in both urban and rural areas.

The optical repeater 122 is connected to the base transceiver station 120 using an optical cable 121 in order to offer mobile communication services to area B. The optical repeater 122 has the same PN (Pseudo Noise) code as the wireless base station which includes the base transceiver station 120. Accordingly, the CDMA communication network recognizes the optical repeater 122 as being identical to the wireless base station to which the optical repeater 122 is connected by the optical cable 121. The optical repeater 122 reduces the cost of installing an additional base transceiver station (over 5 hundred million Won per base station) and broadens the coverage of the base transceiver station 120 to include its coverage.

The mobile switching center (MSC) 140 controls the wireless base stations to more effectively operate and communicate with an electronic switching system installed in a public telephone network. The mobile switching center 140 receives data or messages from the test terminal 110 through the base station controller 130 and transfers the received data or messages to the position determination entity 160 via the signal transfer point (STP) 150. The mobile switching center 140 performs basic and supplementary service processing, subscriber's incoming and outgoing call processing, position record and handoff processing, and communicating with other networks. The mobile switching center 140 can support IS (Interim Standard)-95 A/B/C systems, as well as 3G and 4G mobile communication networks.

The signal transfer point (STP) 150 is a signal relay station for relaying and exchanging signal messages in a common channel signaling system of ITU-T. A signal network formed using the STP 150 operates in an non-associated mode which does not associate a speech path with a signal path. Various signals are transferred via the STP having a speech path, other than the switching center, thereby improving reliability and cost-effectiveness. Also, the STP 150 converts a signal message. When it is not possible to relay a signal message, the STP 150 notifies the signal message to another switching center.

The position determination entity 160 receives and analyzes the MAR optimizing data transmitted from the test terminal 110 to know a wireless base station for which MAR optimization is needed. The position determination entity 160 performs MAR optimization based on the analysis results. As a result of optimization, the MAR of the object wireless base station is updated to a new value which is then stored in the MAR database 162. The MAR optimization performed by the position determination entity 160 will be explained in more detail with reference to FIG. 2.

The position determination entity 160 performs a series of functions required to determine the location of an object. The position determination entity 160 calculates the longitude and latitude coordinates of the test terminal 110 using the A-GPS data transferred from the test terminal 110 through the mobile communication network. More specifically, when receiving rough position information (such as identification code of a wireless base station) from the test terminal 110, the position determination entity 160 searches the MAR database 162 to detect and read the MAR set for the pertinent wireless base station.

Upon detecting the geolocation information and MAR of the pertinent wireless base station, the position determination entity 160 sends a message "Provide GPS Acquisition Assistance" as defined in the IS-801-1 Standards, including information (coordinate information, identification code, etc.) of every GPS satellite 102 from which GPS signals can be received in that wireless base station, to the test terminal 110 through the mobile communication terminal. In other words, the position determination entity 160 receives the orbit information of the GPS satellites 102 from the reference GPS antenna 170 which monitors all GPS satellites 102 in real time. Subsequently, the position determination entity 160 extracts information about the GPS satellites 102 from which GPS signals can be well received by the test terminal 110, using the longitude and latitude coordinates and MAR of the wireless base station of the area in which the test terminal 110 is located. The position determination entity 160 transfers the extracted information about the GPS satellites 102 to the test terminal 110, together with the message "Provide GPS Acquisition Assistance."

When receiving the message "Provide GPS Acquisition Assistance," the test terminal 110 extracts the information about the GPS satellites 102 included in that message. Also, the test terminal 110 detects and receives GPS signals emitted from one or more GPS satellites 102.

Based on the received GPS signals, the test terminal 110 determines the identification codes and number of GPS satellites from which GPS signals have been received, the strength of the GPS signals and the pseudorange. The test terminal 110 transfers A-GPS data and a message "Provide Pseudorange Measurement" as defined in the IS-801-1 Standards to the position determination entity 160 through the mobile communication network. Upon receiving the message "Provide Pseudorange Measurement" from the test terminal 110, the position determination entity 160 extracts data included in that message and calculates the longitude and latitude coordinates of the test terminal 110.

The MAR database 162 stores a table of MARs which are set according to the identification codes of the plurality of wireless base stations. When receiving an A-GPS position determination request signal, including the identification code of a wireless base station, from the test terminal 110, the position determination entity 160 detects the table of MARs stored in the MAR database 162 and transfers assistance data, including information about the GPS satellites which are visible in the area of the pertinent wireless base station, to the test terminal 110.

The MAR database 162 receives a new MAR of the wireless base station for which MAR optimization has been performed by the position determination entity 160, and updates the table of MARs accordingly. Also, the MAR database 162 stores the updated table of MAR values.

The MAR optimizing database 164 stores the MAR optimizing data received by the position determination entity 160 from the test terminal 110. The MAR optimizing database 164 classifies the MAR optimizing data according to the measurement dates, times and equipment, as well as the wireless base stations. Accordingly, the position determination entity 160 can search the MAR optimizing database 164 and perform a required MAR optimization.

Figure 2:
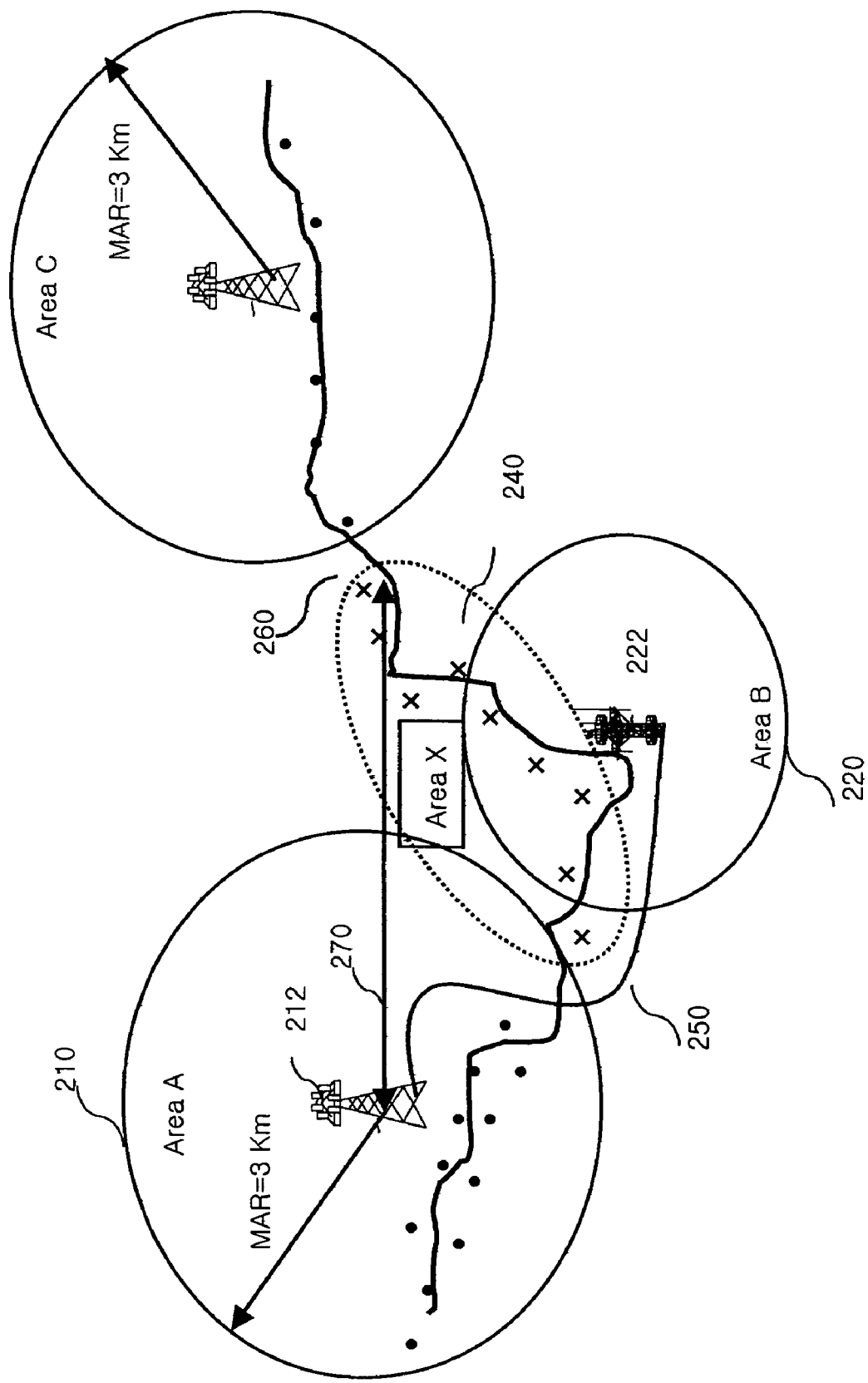
FIG. 2 is a view explaining the MAR optimization in accordance with the preferred embodiment of the present invention.

FIG. 2 is a view explaining the MAR optimization in accordance with the preferred embodiment of the present invention.

In order to optimize the MAR, an operator of the test terminal 110 moves between the wireless base stations, using a moving means such as a vehicle. The operator obtains MAR optimizing data at every predetermined time interval through a process as explained with reference to FIG. 1, using the test terminal 100. The measurement point for obtaining the MAR optimizing data should preferably be an open sky where GPS satellites are easily observed, that is, where GPS satellite signals can easily be detected. The operator who began to obtain MAR optimizing data in area A 210 transfers the MAR optimizing data obtained at every measurement point to the position determination entity 160.

The position determination entity 160 analyzes the MAR optimizing data received from the test terminal 110, determines a wireless base station for which MAR optimization is required, and performs the required MAR optimization. Drawing reference numeral "260" in FIG. 2 is a vehicle moving path. Dots • in the vehicle moving path are points at which C-GPS geolocation information and A-GPS data can be well received. Xs in the vehicle moving path are points at which C-GPS geolocation information can be well received but A-GPS data cannot be satisfactorily received.

In other words, the dots in the vehicle moving path are points at which over a predetermined number of GPS satellites are observed by the position determination entity 160 using A-GPS scheme. The Xs in the vehicle moving path are points at which less than a predetermined number of GPS satellites are observed using A-GPS scheme. Observation of GPS satellites means detecting and receiving GPS signals emitted from the GPS satellites. Accordingly, a wireless base station for which MAR optimization is needed can be wireless base station A 212 located adjacent to the area having Xs in FIG. 2 where over a predetermined number of GPS satellites are observed according to C-GPS scheme but less than the predetermined number of GPS satellites are observed according to A-GPS scheme.

Referring to FIG. 2, area B 220 covered by an optical repeater 222 includes most Xs. When the test terminal 110 is located within area A corresponding to the MAR set for the wireless base station A 212, the assistance data transferred from the position determination entity 160 can include proper GPS satellite information and lots of GPS satellites 102 can be observed. However, when the test terminal 110 gets out of area A 210 and enters area B 220 covered by the optical repeater 222, it cannot accurately determine its location by A-GPS scheme.

The test terminal 110, having moved into area B 220, sends a position determination request signal to the position determination entity 160 to obtain A-GPS data. The signal includes the identification code of the wireless base station A 212. The position determination entity 160 detects and transfers information about GPS satellites 102 from which GPS signals can be received, using the MAR set for the wireless base station A and the position coordinates of the wireless base station A. Since the transferred information about GPS satellites 102 is extracted using the MAR set for the wireless base station A 212, it is useful and effective only within area A 210.

However, when the test terminal 110 moves toward area B 220, it cannot receive a sufficient number of GPS signals (about three or more). This is because the test terminal 110 detects GPS signals using improper information about GPS satellites 102 which is effective only in area A 210.

To solve this problem, MAR optimization is performed to increase the MAR set for the wireless base station A 212. For the MAR optimization, the position determination entity 160 analyzes MAR optimizing data classified and stored according to the wireless base stations. The position determination entity 160 calculates the distance from the wireless base station A to the farthest X point based on the MAR optimizing data, and updates the MAR set for the wireless base station A to a new MAR. In FIG. 2, the distance indicated by drawing reference numeral "270" becomes the new MAR of the wireless base station A 212. If the position determination entity 160 updates the MAR of a particular wireless base station, the wireless base station will cover an area having a radius equal to the newly updated MAR.

Figure 3:
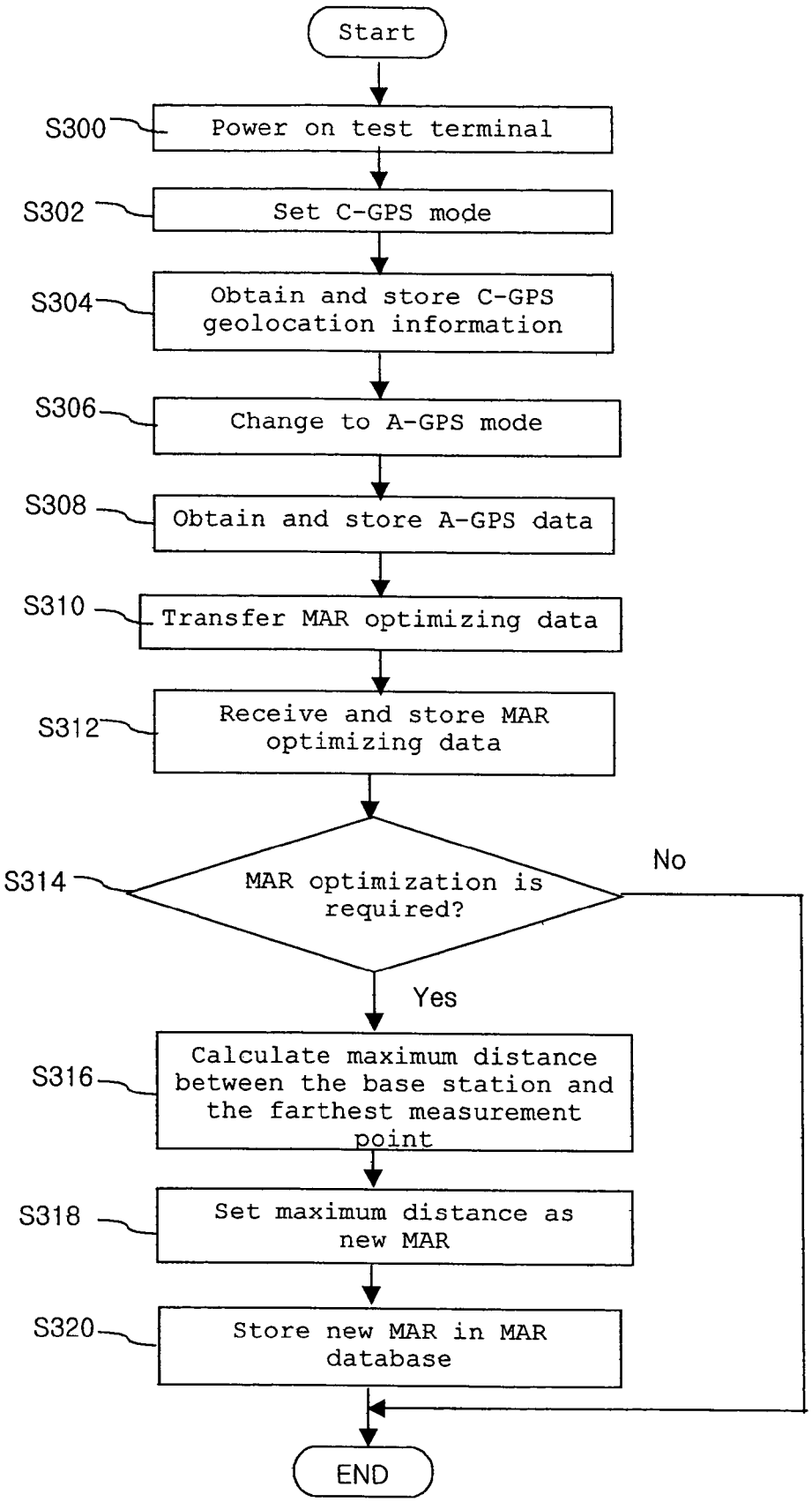
FIG. 3 is a flow chart showing a process of optimizing the MAR preset for a wireless base station in accordance with the preferred embodiment of the present invention.

FIG. 3 is a flow chart showing a process of optimizing the MAR set for a wireless base station in accordance with the present invention.

In accordance with the present invention, an operator who moves using a moving means, such as a vehicle, stops at predetermined time intervals or at regular distances and turns on the test terminal 110 for measurement (S300). The operator sets the test terminal 110 to a C-GPS operation mode using a program installed in the test terminal 110 or by operating a key button formed on the outer surface of the test terminal 110 (S302). In the C-GPS operation mode, the test terminal 110 detects GPS signals, extracts C-GPS geolocation information included in the detected GPS signals, and stores the extracted information in its internal memory (S304).

Upon completion of obtaining the C-GPS geolocation information at step 304, the operation mode of the test terminal 110 is changed to an A-GPS operation mode (S306). Like the setting of C-GPS operation mode at step 302, the change of mode to the A-GPS operation mode is carried out according to a program installed in the test terminal 110 or by operating a predetermined key button. More preferably, a GPS measurement program installed in the test terminal 110 can be coded to automatically change the mode of the test terminal 110 to the A-GPS operation mode upon completion of the process of obtaining the C-GPS position information in the C-GPS operation mode. In the A-GPS operation mode, the test terminal 110 detects GPS signals, extracts A-GPS data included in the GPS signals and temporarily stores the extracted A-GPS data in the memory (S308).

As explained in conjunction with FIG. 1, the test terminal 110 sends an A-GPS position determination request signal to the position determination entity 160 and receives assistance data from the position determination entity 160. The test terminal 110 detects GPS signals using the coordinate information of GPS satellites, which is included in the assistance data. Subsequently, the test terminal 110 generates and stores A-GPS data using navigation data included in the GPS signals.

Although the test terminal 110 first operates in the C-GPS mode and then changes to the A-GPS mode according to FIG. 3, it can first operate in the A-GPS mode and then change to the C-GPS mode.

The test terminal 110 transfers the MAR optimizing data obtained at steps 304 through 308 to the position determination entity 160 using its built-in wireless modem (S310). The position determination entity 160 stores the MAR optimizing data received from the test terminal 110 in the MAR optimizing database 164.

The position determination entity 160 periodically reads out the MAR optimizing data classified according to the wireless base stations at predetermined time intervals, and determines whether the MAR of a wireless base station should be optimized (S314). If the position determination entity 160 determines that MAR optimization is required for a particular wireless base station, it computes the distance from the object wireless base station to the farthest measurement point (S316). The coordinate information of the farthest measurement point can be obtained by searching for the longitude and latitude coordinates of the measurement point which are included in the C-GPS position information or calculated based on the A-GPS data.

At step 318, the position determination entity 160 sets the computed maximum distance at step 316 as a new MAR of the object wireless base station. Also, the position determination entity 160 updates the table of MARs stored in the MAR database to include the new MAR of the object wireless base station, and stores the updated table (S320).

Although a preferred embodiment of the present invention has been described for illustrative purposes, those skilled in the art will appreciate that various modifications, additions and substitutions are possible, without departing from the scope and spirit of the invention as disclosed in the accompanying claims.

As described above, in a conventional mobile communication network, a mobile communication terminal often fails to determine its location using A-GPS scheme because a uniform MAR is set for each wireless base station. In accordance with the present invention, however, the MAR is adjusted to greatly reduce the rate of failure to determine the location using A-GPS scheme.

What is claimed is:

1. A system for optimizing location-based services by adjusting a maximum antenna range (MAR) of a base station, the system comprising:

a test terminal for generating and transmitting a MAR optimizing data signal for use in optimizing the MAR, wherein the MAR optimizing data signal comprises conventional-GPS (C-GPS) geolocation information obtained in a C-GPS operation mode and assisted-GPS (A-GPS) data obtained in an A-GPS operation mode;

a base transceiver station for transmitting and receiving signals to and from the test terminal and having a preset MAR;

a base station controller for receiving and processing signals transmitted from the base transceiver station and a mobile switching center connected to the base station controller; and a position determination entity for receiving the MAR optimizing data signal through a mobile communication network including the base transceiver station, the base station controller and the mobile switching center, and analyzing the MAR optimizing data signal to update the preset MAR of base transceiver station.

2. The system according to claim 1, wherein the position determination entity has an MAR optimizing algorithm for setting a maximum distance among distances between the wireless base station including the base transceiver station and each measurement point, as a new MAR to update the preset MAR.

3. The system according to claim 2, wherein the MAR optimizing algorithm obtains the maximum distance by calculating the distance between the longitude and latitude coordinates of the base station transceiver and those of each measurement point.

4. The system according to claim 3, wherein the longitude and latitude coordinates of each measurement point are included in the C-GPS geolocation information received by the position determination entity.

5. The system according to claim 1, wherein the test terminal is equipped with a C-GPS receiver.

6. The system according to claim 1, wherein the test terminal is equipped with an A-GPS receiver module.

7. The system according to claim 1, wherein the test terminal is a PDA (Personal Digital Assistant), a cell phone, a PCS (Personal Communication Service) phone, a handheld PC, a GSM (Global System for Mobile) phone, a W-CDMA (Wideband CDMA) phone, a CDMA-2000 phone, a MBS (Mobile Broadband System) phone, a notebook computer or a laptop computer.

8. The system according to claim 1, wherein the mobile communication network includes a synchronous or asynchronous mobile communication network or a 4G ALL-IP communication network.

9. The system according to claim 1, wherein the position determination entity communicates with an MAR database storing a table of MARs which are set according to identification codes of a plurality of wireless base stations.

10. The system according to claim 9, wherein the position determination entity updates the table of MARs using a newly updated MAR and stores the updated table in the MAR database.

11. The system according to claim 1, wherein the position determination entity communicates with an MAR optimizing database which stores the MAR optimizing data received from the test terminal.

12. The system according to claim 11, wherein the MAR optimizing database stores the MAR optimizing data classified according to at least one of measurement dates, measurement times and identification codes of the wireless base stations.

13. The system according to claim 1, wherein the position determination entity communicates with a reference GPS antenna which monitors geolocation information in real time according to identification codes of the GPS satellites.

14. A method for optimizing location-based services in a system comprising a test terminal for receiving GPS signals by using a conventional GPS (C-GPS) operation mode or an assisted-GPS (A-GPS) operation mode, a mobile communication network which includes wireless base stations having a preset maximum antenna range (MAR) and a mobile switching center, and a position determination entity for resetting the MAR by interworking with an MAR database storing geolocation information and the MAR of the wireless base stations, the method comprising the steps of:

(a) receiving and storing C-GPS geolocation information obtained in the C-GPS operation mode and A-GPS data obtained in the C-GPS operation mode, the C-GPS geolocation information and A-GPS data being transferred from the test terminal;

(b) analyzing the C-GPS geolocation information and A-GPS data of each wireless base station to determine an object wireless base station for which MAR optimization is needed, wherein the object wireless base station is located adjacent to or covers at least one measurement point at which over a predetermined number of GPS satellites are observed and included in the C-GPS geolocation information and less than the predetermined number of GPS satellites are observed and included in the A-GPS data;

(c) calculating a new MAR by using a MAR optimizing algorithm, wherein the MAR optimizing algorithm sets the maximum distance between the wireless base station and each measurement point as the new MAR; and (d) setting the new MAR as the optimized MAR of the object wireless base station and storing it in the MAR database.

15. The method according to claim 14, wherein the C-GPS geolocation information contains information on latitudes, longitudes and number of GPS satellites from which the GPS signals have been received.

16. The method according to claim 14, wherein the A-GPS data contains satellite identification codes, number of satellites, measurement time, strength of the GPS signals, pseudoranges, network IDs (NID) and base station IDs (BSID).

17. The method according to claim 16, wherein the BSID is an identification code of a wireless base station whose coverage covers the test terminal which has transferred the C-GPS geolocation information.

18. The method according to claim 14, wherein the position determination entity stores the received C-GPS geolocation information and A-GPS data in an MAR optimizing database at step (a).

19. The method according to claim 18, wherein the position determination entity classifies the C-GPS geolocation information and the A-GPS data according to identification codes of the wireless base stations and stores the classified information and data in the MAR optimizing database.

20. The method according to claim 14, wherein the MAR optimizing algorithm obtains the maximum distance by calculating the distance between the longitude and latitude coordinates of the wireless base station and those of each measurement point.

21. The method according to claim 20, wherein the longitude and latitude coordinates of each measurement point are included in the C-GPS geolocation information received by the position determination entity.

* * * * *